United States Patent Office 2,798,865
Patented July 9, 1957

2,798,865
PETROLEUM RESINS

Fred W. Banes, Westfield, Joseph F. Nelson, Rahway, and Robert G. Hoyt, Cranford, N. J., assignors to Esso Research and Engineering Company, a corporation of Delaware No Drawing. Application October 31, 1952,
Serial No. 318,068

4 Claims. (Cl. 260—82)

This invention is concerned with the preparation of high quality, light colored resins from selected steam cracked petroleum fractions and, more specifically, with the use of dimers and codimers of cyclopentadienes in conjunction with steam cracked, unsaturated petroleum fractions as feed for preparing polymerized resins with Friedel-Crafts catalysts.

It is known to prepare resins from steam cracked petroleum distillate fractions by polymerization with Friedel-Crafts catalysts. Generally, the cyclodienes, such as cyclopentadiene and methyl cyclopentadiene, if present in the feed streams, are removed from the steam cracked distillate streams prior to subjecting them to polymerization. It has been discovered that, in producing resins from unsaturated, steam cracked petroleum streams, much better results are obtained when dimers, including codimers of the cyclopentadienes are present in the feed in controlled proportions. The inclusions of at least one and possibly more, of these materials in the olefinic feed for preparing the resins permits the Friedel-Crafts polymerization to proceed smoothly, giving a higher yield of resin of a given quality or an equivalent yield of resin of superior quality. The addition of these materials is of particular importance in that they permit the making of resins having appreciably higher softening points.

In carrying out the invention, petroleum fractions such as kerosene, gas oil, naphtha, etc. are cracked in the presence of steam at temperatures above 1000° F. and up to 1500° F. to give highly unsaturated product streams. The distillate streams having olefinic components boiling in the range of 20° up to about 240° C. largely 20° to 130° C. are then subjected to operations of thermal soaking and distillation to remove unsaturated hydrocarbons such as the cyclic diolefins, including cyclopentadiene and methylcyclopentadiene. The material boiling substantially above +130° C. in the initial stream largely consists of previously formed dimers and codimers of the cyclopentadienes. The resulting naphtha stream of boiling range 20° to 130° C. usually contains about 14 to 30% benzene, 4 to 9% toluene, 7 to 22% diolefins, 0 to 5% paraffins and from 34 to 75% olefins and cyclic olefins. The diolefin content of the mixture was obtained by reacting a mixture of 1.5 to 3.0 ml. of sample and 2.5 ml. of chloromaleic anhydride (diluted with 2 ml. benzene containing 0.1% tertiary butyl catechol) for 3 hours at 100° C., and steam distilling the resulting reaction mixture for 2 hours to recover HCl (1 mole/mole of diolefin). When these fractions of steam cracked distillate are treated with a catalyst such as aluminum chloride, aluminum bromide, and the like, about 10% up to 40% of the unsaturated naphtha is converted to polymeric materials. In general, these resins are found to be somewhat brittle, and the softening points of these materials are too low to permit them to be used as such, for example, in making up floor tile and certain coatings.

As a typical example, the aluminum chloride resin products have softening points of 75° to 90° C. at polymerization conversion levels of 20 to 35% based on the original naphtha feed.

Generally, in the preparation of these petroleum resins, catalyst concentrations of 0.5 up to 3.0% are advantageously employed and the polymerizations are carried out at temperatures of −20° up to 90° C., preferably 0 to 75° C.

During the usual process of recovering the cyclodienes from the steam cracked naphthas, both the cyclo and methyl cyclopentadienes are converted to the dimers or mixed dimers as the result of thermal dimerization. If desired, these dimers can be separated and depolymerized and fractionated to give the individual cyclodiene monomers as chemically pure compounds which can be utilized as such.

By operating according to this invention, resins of higher softening points and good qualities can be prepared by including in the unsaturated stream above 5% up to 50%, and preferably from above 5% to 20% of dicyclopentadiene, di-methyl-cyclopentadiene, or di-$C_7$-cyclopentadienes, codimers, mixtures of dimers, or concentrates thereof, based on the amount of total hydrocarbon feed. The amount of cyclopentadiene dimers to be added will depend upon two factors, namely, the amount of such dimers already present in the feed, and the final amount required to be present in the polymerization feed.

It is necessary to have the cyclodienes present as the dimers rather than as the monomers, since the monomers when present in any appreciable concentration in the polymerization reaction mixture, tend to give products having appreciable quantities of insoluble, gelled polymer. However, the use of the dimers or codimers of cyclopentadiene and methyl cyclopentadiene or concentrates and mixtures thereof, produces completely soluble resinous products as well as the desired resins of increased softening point.

It is contemplated that the unsaturated feed mixtures for the resin process can be obtained in a number of ways. For instance, the appropriate distillate streams which are normally obtained, contain appreciable quantities of the cyclodiene monomers or monomer-dimer mixtures. Such streams are subjected to thermal soaking for 4 to 8 hours at temperatures of from 100 to 150° C. in order to convert all monomers to the dimers or co-dimers. The resulting stream is then treated with aluminum chloride or some other Friedel-Crafts catalyst in order to produce the improved resinous products. It may be necessary to adjust the concentration of dimers by the addition of more dimers in order to have the desired concentration in the polymerization feed.

As an alternate method, the cyclodienes can be converted to dimers by thermal soaking, following which the total stream is subjected to distillation under conditions whereby the cyclodiene dimers are maintained in the dimerized form, and are separated as a residue. The dimers are then depolymerized and fractionated to give the individual cyclodiene monomers. If desired, selective portions of the cyclodienes are dimerized and added to the separated distillate fraction in order to obtain the improved olefinic feed for the polymerization.

Another method utilizes a recycle stream from the recovery of the cyclodienes. During the recovery of cyclopentadiene and methyl cyclopentadiene from the dimer concentrates after thermal soaking, a product fractionator bottoms is normally obtained which contains unrecovered cyclodiolefin dimers as well as $C_8$ to $C_{10}$ aromatics and $C_9$ to $C_{11}$ olefins and diolefins. If this bottoms stream is taken as a purge stream and added to the unsaturated naphtha from which the cyclodienes have been removed, the resulting mixture is found to be an excellent feed stock for producing higher softening point resins by Friedel-Crafts polymerization.

In addition to the improved softening points and solubilities of the resins prepared according to the invention, it has been further found that the products have greater usefulness since they can be thermally bodied to produce resins having even higher softening points. On the other hand, it has been found that similar resins prepared from feed stock in which no cyclopentadienes or their dimers were present, harden more slowly and darken severely during the attempted thermal bodying process.

It is to be understood that this improved method for preparing resins can be satisfactorily operated either as a batch or continuous process.

Typical examples of the invention are set forth below, although it is not intended to limit the invention in any way to the particular experiments presented.

stream A (Table I) in combination with various cyclodiene streams (c, d, e, f, g, Table I). The resins were produced by polymerizing each of the indicated feed mixtures with 1% aluminum chloride at 20° C.

The data obtained as a result of this series of experiments are shown in Table II. In every experimental run in which there was addition of the dimers and codimers to the basic naphtha feed (runs 2-6, incl.), the resinous products had the desirable higher softening points above about 90° C. and the color of the resins was as good or better than the control. In every case when 5% or more of the dimer stream was added, the yield of resins was higher and the softening point was 10 to 20° higher than that of the control. In addition, runs 1-6, inclusive, produced a completely soluble resin having no gel content. However, in runs 7 and 8 where cyclodiene monomers were added to the naphtha stream, undesirable amounts of insoluble gel were formed.

*Table I*

COMPOSITION OF CYCLODIENE AND NAPHTHA STREAMS USED IN PREPARING FEED

| Naphtha Streams—Designation | A | B | C | D | E |
|---|---|---|---|---|---|
| Distillation, Wt. Percent: | | | | | |
| I. B. P. 48° C | 14 | 24 | 2 | 39 | 33 |
| 48-70° C | 18 | 20 | 25 | 18 | 12 |
| 70-85° C | 50 | 38 | 49 | 29 | 32 |
| 85-130° C | 16 | 15 | 20 | 10 | 12 |
| 130+ °C | 2 | 3 | 4 | 4 | [1] 11 |
| Composition, Wt. Percent: | | | | | |
| Aromatics— | | | | | |
| Benzene | 29.1 | 19.6 | 23.8 | 14.5 | 16 |
| Toluene | 6.8 | 4.2 | 5.1 | 5.7 | 5.2 |
| $C_8$ Aromatics | <1 | <1 | <1 | <1 | 3 |
| Diolefins | 14 | 15 | 8 | 14.5 | [2] 24 |
| Paraffins | 1 | 1 | 2 | 2 | 5 |
| Olefins | 49.1 | 60.2 | 61.1 | 59.6 | 46.8 |

| Cyclopentadiene Streams—Designation | a | b | c | d | e | f | g |
|---|---|---|---|---|---|---|---|
| Composition, Wt. Percent: | | | | | | | |
| Cyclopentadiene | [1] 42 | [1] 75 | [1] 96 | [1] 5 | [3] 98 | [3] 2.6 | [1] 23 |
| Methylcyclopentadiene | [1] 34 | [1] 14 | [1] 2 | [1] 92 | [3] 1 | [3] 97.4 | [1] 53 |
| $C_7$ Cyclopentadienes | [1] 6 | [1] 5 | | [1] 2.5 | | | |
| Acyclic $C_5$ dienes | [1] 6 | [1] 6 | [1] 2 | [1] 0.5 | 1 | | |
| Other Hydrocarbons | 12 | | | | | | 24 |

[1] Dimers or codimers.
[2] Including dimerized diolefins.
[3] Monomers.

*Table II*

| Run No. | Hydrocarbon Feed | | | | Resin Yield [3] | Resin Properties | |
|---|---|---|---|---|---|---|---|
| | Naphtha Stream | Weight Percent | Cyclodiene Stream | Weight Percent | Weight Percent on Feed | Soft. Pt.,[4] °C. | Color [2] |
| 1 | A | 100 | | | 30 | 78 | 3 |
| 2 | A | 98 | d | 2 | 28.3 | 89 | 3 |
| 3 | A | 95 | c | 5 | 32 | 90 | 4 |
| 4 | A | 90 | c | 10 | 34 | 93 | 2 |
| 5 | A | 90 | d | 10 | 34 | 97 | 2 |
| 6 | A | 90 | g | 10 | 34.5 | 90 | 3 |
| 7 | A | 90 | e | 10 | [1] 36 | 96 | 3 |
| 8 | A | 90 | f | 10 | [1] 34.6 | 95 | 3 |

[1] Includes cross-linked, insoluble gel polymer. Gel was also deposited on reactor walls.
[2] Color of a solution of 1 g. resin in 67 ml. of xylenes compared to the Gardner Color Index.
[3] Batch polymerizations.
[4] Ring and ball softening point (ASTM E-28-51-T).

EXAMPLE 1

A series of resins were prepared from a number of feed mixtures. These feed mixtures consisted of varying ratios of two types of component streams, a cyclodiene stream and a naphtha stream. The compositions of the varying component streams used are shown in Table I. Table II shows polymerization data obtained by using naphtha

EXAMPLE 2

A second series of resins was prepared using naphtha B of Table I in combination with varying amounts of cyclodiene dimer concentrates a and b. The data are shown in Table III. The addition of the dimer concentrate in each case resulted in outstanding increases in resin softening point.

Table III

| Run No. | Hydrocarbon Feed (Table I) | | | | Percent AlCl₃ | Wt. percent on Feed | | Resin Properties | |
|---|---|---|---|---|---|---|---|---|---|
| | Naphtha Stream | Wt. Percent | Cyclodiene Stream | Wt. Percent | | Resin[1] | Liquid Polymer | Soft. Pt.,°C. | Iodine No.[2] |
| 9 | B | 100 | | | 1.5 | 31.5 | 4.7 | 87 | 192 |
| 10 | B | 90 | b | 10 | 1.5 | 34.4 | 3.2 | 101 | 198 |
| 11 | B | 80 | b | 20 | 1.5 | 34 | 4 | 113 | 160 |
| 12 | B | 90 | a | 10 | 1.5 | 33 | 4.6 | 102 | 168 |
| 13 | B | 80 | a | 20 | 1.5 | 35.8 | 6.0 | 112 | 148 |

[1] No gel produced in any of these runs.
[2] ASTM (D-555-47).

EXAMPLE 3

Another series of runs was carried out to show the effects of catalyst concentration and variation of feed streams. The catalyst was added over a ½ hour period at 20° C. and the reaction mixture then was agitated for 1 hour at 45° C. Details of the runs are shown in Table IV. The resins resulting from the feeds containing cyclodiene dimers contained no gel, and in each case showed yields and softening points well above those of the control resins from naphthas having substantially no cyclodiene dimers present.

thermal treatment to give naphtha E. No dimers were separately added. Run 29 uses, as feed, naphtha E to which has been added 10% of mixed cyclodiene dimer concentrate.

It is seen from the data of Table V that regardless of whether the dimers are prepared by dimerizing in situ the cyclodienes initially present in the naphtha stream, or whether the dimers or dimer concentrate are added to the naphtha stream in a separate step, the resin production is entirely satisfactory. In both runs 28 and 29, the yield of resin was high, the amount of liquid polymer was low

Table IV

| Run No. | Hydrocarbon Feed (Table I) | | | | Percent AlCl₃ | Weight Percent on Feed | | Resin Properties | | |
|---|---|---|---|---|---|---|---|---|---|---|
| | Naphtha Stream | Wt. Percent | Cyclodiene Stream | Wt. Percent | | Resin | Liquid Polymer | Soft. Pt.,°C. | Color Index | Iodine Number |
| 14 | C | 100 | | | 1.0 | 20.3 | 4.5 | 82 | 5 | 217 |
| 15 | C | 100 | | | 2.0 | 20.5 | 6.5 | 83.5 | 7 | 209 |
| 16 | C | 90 | c | 10 | 1.0 | 24.4 | 4.6 | 91 | 5 | 214.8 |
| 17 | C | 90 | c | 10 | 2.0 | 24.6 | 5.5 | 95 | 7 | 203.0 |
| 18 | C | 90 | d | 10 | 1.0 | 24.0 | 3.5 | 108.5 | 6 | 238.1 |
| 19 | C | 90 | d | 10 | 2.0 | 28.0 | 4.6 | 112 | 8 | 218.3 |
| 20 | A | 90 | a | 10 | 2.0 | 25.4 | 4.6 | 103 | 6 | 210.0 |
| 21 | B | 100 | | | 1.0 | 31.5 | 4.7 | 87 | 3 | 192 |
| 22 | B | 100 | | | 2.0 | 33.0 | 5.0 | 92 | 5 | |
| 23 | B | 90 | d | 10 | 1.0 | 35.3 | 5.0 | 115 | 4 | 196.3 |
| 24 | B | 90 | d | 10 | 2.0 | 39.3 | 3.5 | 116 | 6 | |
| 25 | B | 80 | d | 20 | 1.0 | 39.9 | 3.9 | 128 | 4.5 | |
| 26 | B | 80 | d | 20 | 2.0 | 40.8 | 6.3 | 130 | 7.0 | 215.6 |

EXAMPLE 4

This example shows that the cyclodiene dimers may be present in the feed and need merely be controlled in order to accomplish satisfactory results. In run 27, substantially all cyclodiene dimers had been removed from the feed and none were added. In run 28, the naphtha feed used contained initially mixed cyclodiene monomers and dimers which were converted completely to dimers by and superior high softening point resins were obtained. The polymerizations were carried out at 45° C. using 0.75% AlCl₃.

Table V

| Run No. | Hydrocarbon Feed (Table I) | | | | Wt. Percent of Dimers in Feed | Wt. Percent on Feed | | Resin Soft. Point, °C. |
|---|---|---|---|---|---|---|---|---|
| | Naphtha Stream | Wt. Percent | Cyclodiene Stream | Wt. Percent | | Resin | Liquid Polymer | |
| 27 | D | 100 | | | 1.5 | 32.2 | 3.4 | 90 |
| 28 | E | 100 | | | 9.7 | 36.4 | 3.8 | 98 |
| 29 | E | 90 | a | 10 | 16.5 | 37.2 | 4.8 | 107 |

EXAMPLE 5

The effect of polymerization temperature was also studied. A catalyst of 1.5% AlCl₃ was used. In a series of runs shown in Table VI, it is shown that as the temperature increases, the yield of resin increases. For a given softening point, a higher yield of solid resin is obtained with little increase in the undesirable liquid polymer fraction.

Table VI

| Run No. | Hydrocarbon Feed | | Reaction Temp., °C. | Wt. Percent Yield | | Resin Properties | |
|---|---|---|---|---|---|---|---|
| | Wt. Percent Naphtha B | Wt. Percent Dimer Concentrate a | | Resin | Liquid Polymer | Soft. Pt., °C. | Iodine No.[1] |
| 30 | 90 | 10 | 0 | 32.6 | 3.8 | 97 | |
| 31 | 90 | 10 | 20–25 | 33 | 4.6 | 102 | 168 |
| 32 | 90 | 10 | 55–60 | 35.4 | 6.8 | 103 | |
| 33 | 90 | 10 | 65–70 | 35.8 | 5.9 | 101 | |

[1] ASTM (D-555-47).

What is claimed is:

1. A process for the preparation of petroleum resins which comprises the steps of preparing a steam cracked distillate fraction of boiling range 30° to 130° C. from which substantially all of the cyclodienes have been removed, adding to said fraction from 5% to 20% of cyclopentadiene dimers and polymerizing the resulting mixture with aluminum chloride catalyst at a temperature of from 0° to 70° C.

2. A process for the preparation of petroleum resins which comprises cracking a petroleum fraction at above 1000° F. in the presence of steam to give a cracked product stream, isolating an unsaturated naphtha stream, thermally soaking said stream to dimerize substantially all cyclic diolefins, separating two fractions therefrom, a cyclic diolefin dimer stream and a naphtha stream boiling substantially from 20° to 130° C. and containing from 14 to 30 weight percent benzene, from 4 to 9 weight percent toluene, from 7 to 22 weight percent diolefins, from 0 to 5 weight percent paraffins, and from 34 to 75 weight percent olefins, adding to said naphtha stream from 5 to 20 weight percent of the separated dimerized cyclic diolefins, subjecting said unsaturated mixture to polymerization in the presence of an AlCl₃ catalyst at a reaction temperature between 0° and 75° C., and separating the petroleum resin product therefrom.

3. A resin product prepared by the process described in claim 2.

4. A process for the preparation of petroleum resins which comprises preparing a steam-cracked distillate fraction boiling between 30 and 130° C., heating said fraction to dimerize substantially all the cyclic diolefins contained therein and polymerizing the resulting mixture with aluminum chloride catalyst at a temperature between 0 and 70° C.

References Cited in the file of this patent

UNITED STATES PATENTS

| 1,982,708 | Thomas et al. | Dec. 4, 1934 |
| 2,067,073 | Carmody | Jan. 5, 1937 |
| 2,352,980 | Soday | July 4, 1944 |

OTHER REFERENCES

Wilson et al.: India Rubber World, 110, pages 61–63, April 1944.

Whitmore: "Organic Chemistry," page 639 (1937).